United States Patent Office 3,030,282
Patented Apr. 17, 1962

3,030,282
ELECTRODEPOSITION OF COPPER
Frank Passal, Detroit, Mich., assignor to Metal & Thermit Corporation, Woodbridge Township, Middlesex County, N.J., a corporation of New Jersey
No Drawing. Filed May 2, 1961, Ser. No. 107,057
19 Claims. (Cl. 204—52)

The present invention relates to the electrodeposition of decorative and protective copper plate from improved alkaline-cyanide type baths. This is a continuation-in-part of application Serial No. 800,381, filed March 19, 1959, now abandoned.

The object of this invention is to provide improved baths for the electrodeposition of copper.

Another object of this invention is to provide an improved process for electrodepositing copper.

The present invention contemplates electrodepositing decorative and/or protective copper from alkaline-cyanide baths to which has been added between 0.025 g./l. (grams per liter) and 0.5 g./l. of at least one polyethoxylated or polypropoxylated quaternary salt having the following general structural formula:

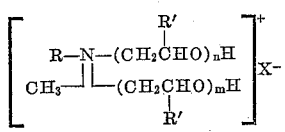

wherein X is an anion, $n$ and $m$ are whole numbers from one to fourteen inclusive; R' is selected from the class consisting of hydrogen and the methyl group, and R is an alkyl radical having from 8 to about 16 carbon atoms in the chain. The alkyl radicals (R) are generally derived from long chain natural acids, the preferred natural product being the coconut derivative, generally called "coco," which is predominantly a $C_{12}$ natural product. The alkyl radicals (R) having between twelve and fourteen carbon atoms in the chain are preferred. When R' is hydrogen, quaternary salts wherein the sum of $n$ and $m$ is in the range of ten to twenty, and most particularly about fifteen, are preferred. When R' is the methyl group, $n$ and $m$ are preferably one.

The quaternary compounds (salts) are prepared by reacting the tertiary nitrogen compound with an alkylating agent such as methyl chloride, dimethyl sulfate, etc. These may be used per se, or the anionic functional group may be replaced by another anion from a water-soluble acid or water-soluble salt. Among the common anions useful in the invention are bromide, chloride, iodide, sulfate, sulfonate, methosulfate, ethosulfate, chloroacetate, citrate, and perchlorate. In the highly ionic cyanide bath, these quaternary salts are ionized with the active wetting agent being the cation which is, obviously, at equilibrium with the various anions in the bath.

These quarternary salts are useful in a wide variety of cyanide type baths containing excess potassium or sodium cyanide (herein called "free cyanide") and in processes for the plating of copper. These generally include the following:

(1) Copper "strike" baths:
Copper _____ about 15 g./l.
Free potassium or sodium cyanide _____ 11–15 g./l.
Temperature _____ 48°–60° C.
Agitation _____ little or none
Current density _____ 10–50 a.s.f.

(2) Intermediate speed baths:
Copper _____ 30–38 g./l.
Free potassium or sodium cyanide _____ 7.5–15 g./l.
Potassium or sodium hydroxide _____ 15–30 g./l.
Potassium or sodium carbonate
 (optional) _____ about 15 g./l.
Temperature _____ generally 65°–82° C.
Agitation _____ yes
Current density _____ 10–80 a.s.f.

(3) Bright copper baths:
Copper _____ 37–75 g./l.
Free potassium or sodium cyanide _____ 3.7–15 g./l.
Potassium or sodium hydroxide _____ 15–30 g./l.
Brightener, e.g., selenium bis
 diethyldithiocarbamate _____ about 0.004 g./l.
Temperature _____ generally 65°–82° C.
Agitation _____ yes
Current density _____ 5–50 a.s.f.

These baths and operating conditions are merely illustrative of plating from alkaline-cyanide type copper baths. Alkaline-cyanide baths and processes are described in "Modern Electroplating," edited by A. G. Gray, pages 98–114 and 194–225 (1953). Other additives of the type commonly used with alkaline-cyanide type baths are generally used in conjunction with the polyethoxylated and polypropoxylated quaternaries of this invention. These include such additives as citrates, tartrates, gluconates, or saccharates, and the metallic brighteners, organic brighteners, etc.

As is generally known in electrodeposition from alkaline-cyanide baths, best results are usually achieved when the process utilizes a method of preventing the thin film immediately adjacent to the cathode from becoming depleted in metal ion content. This is conventionally accomplished by agitation such as solution pumping, cathode movement, air agitation, or by diffusion effects, e.g., current interruption, periodic reversal, etc., or by combinations thereof.

For the purpose of providing a better understanding of this invention, examples of various baths and process conditions successfully utilized are summarized in Table I.

Table I

| constituent in g./l. or plating condition | Example 1 | 2 | 3 | 4 | 5 | 6 | 7 | 8 | 9 |
|---|---|---|---|---|---|---|---|---|---|
| cuprous cyanide | 60 | 60 | 75 | 75 | 90 | 75 | 60 | 60 | 60 |
| potassium cyanide | 102 | | 124 | | 146 | 124 | 102 | 102 | 102 |
| sodium cyanide | | 80.5 | | 89.5 | | | | | |
| potassium hydroxide | 25 | | 30 | 30 | 38 | 30 | 25 | 25 | 25 |
| sodium hydroxide | | 25 | | | | | | | |
| free potassium cyanide | 15 | | 15 | 7.5 | 15 | 15 | 15 | 15 | 15 |
| free sodium cyanide | | 15 | | | | | | | |
| potassium sodium tartrate | 45 | | | | | | | | |
| potassium gluconate | | 25 | | | 25 | 25 | | | |
| potassium saccharate | | | 25 | 25 | | | 25 | | |
| selenium diethyl dithiocarbamate | | | | | | | 0.004 | | |
| tellurium diethyl dithiocarbamate | | | | | 0.012 | | | | |
| lead in g./l. added as Pb(C₂H₃O₂)₂·3H₂O | | | | 0.002 | 0.004 | 0.002 | 0.002 | | |
| nickel sulfate heptahydrate | | | | | | | | 0.25 | 0.25 |
| cobalt sulfate heptahydrate | | | | | | | | 0.25 | 0.25 |
| potassium thiocyanate | | | 15 | 5 | | 5 | | 0.5 | 0.5 |
| Additive 1* | .2 | | | | | 0.1 | | | |
| Additive 2 | | 0.1 | | | | | | | |
| Additive 3 | | | | | 0.10 | | | | |
| Additive 4 | | | 0.1 | | | | | | |
| Additive 5 | | | | | | | 0.1 | | |
| Additive 6 | | | | | 0.15 | | | | |
| Additive 7 | | | | | | | | 0.1 | |
| Additive 8 | | | | | | | | | 0.1 |
| Temperature, °C | 65 | 65 | 65 | 80 | 75 | 75 | 65 | 75 | 75 |

*The specified additives are polyethoxylated or polypropoxylated quaternaries having the alkyl radical (R) group and number of ethylene oxide groups (n+m) specified below. The chloride or the methosulfate salts were used. However, the other anions are equally useful.

| Additive | R | R' | (n+m) |
|---|---|---|---|
| 1 | coco | H | 2 |
| 2 | coco | H | 15 |
| 3 | oleyl | H | 2 |
| 4 | oleyl | H | 15 |
| 5 | stearyl | H | 2 |
| 6 | stearyl | H | 15 |
| 7 | coco | CH₃ | 2 |
| 8 | hydrogenated tallow | CH₃ | 2 |

These quaternary compounds are generally characterized as wetting agents. Their primary function is as anti-pitting agents. However, they also have been found to contribute to deposit brightness, to widen the bright plate current density range when used with brightening additives, and to increase the limiting current density. They are also unusual in that they are compatible with a wide variety of other materials used as wetting agents, permitting their addition to baths initally made up with other wetting agents. Although these materials are characterized by wetting agents as noted hereinbefore, they have the unusual property that the foam produced is relatively unstable. Particularly when used in amounts less than 0.20 g./l., there is little, if any, foaming action. This permits the use of these compounds in installations utilizing air agitation, whereas many other wetting agents may not be utilized in this application.

The sound copper electrodeposits obtained from alkaline-cyanide type baths of the present invention are obtained on such conventional basis metals as iron, steel, nickel, zinc, lead, copper, etc., and alloys thereof. On certain basis metals such as iron or steel and zinc-base die castings, the basis metal is first given an initial thin flash of copper from a low efficiency cyanide copper "strike" bath.

As many embodiments of this invention may be made without departing from the spirit and scope thereof, it is to be understood that the invention includes all such modifications and variations as come within the scope of the appended claims.

I claim:

1. An improved alkaline-cyanide bath for copper plating which comprises copper cyanide, free cyanide, and between 0.025 g./l. and 0.5 g./l. of at least one polyethoxylated quaternary compound having the following formula:

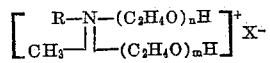

wherein R is an alkyl radical having from 8 to 16 carbon atoms inclusive, X is an anion, and $n$ and $m$ are each whole numbers from 1 to 14 inclusive.

2. The bath as set forth in claim 1 in which the polyethoxylated quaternary compound is one in which the sum of $n$ and $m$ is in the range of 10 to 20.

3. An improved alkaline-cyanide bath for copper plating which comprises copper cyanide, free cyanide, and between 0.05 g./l. and 0.15 g./l. of at least one polyethoxylated quaternary compound having the following formula:

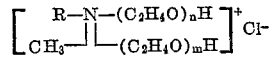

wherein R is an alkyl radical having from 12 to 14 carbon atoms inclusive, and $n$ and $m$ are each whole numbers from 1 to 14 inclusive, and the sum of $n$ and $m$ is between 10 and 20.

4. The bath specified in claim 3 in which the alkyl radical is derived from a natural acid formed from coconut and wherein the sum of $n$ and $m$ is about 15.

5. The bath specified in claim 3 in which the alkyl radical is an oleyl radical and wherein the sum of $n$ and $m$ is about 15.

6. The bath as set forth in claim 3 in which the alkyl radical is a stearyl radical and wherein the sum of $n$ and $m$ is about 15.

7. In the process of electrodepositing copper, one step of depositing copper from an alkaline-cyanide bath comprising copper cyanide, free cyanide, and between 0.025 g./l. and 0.5 g./l. of at least one polyethoxylated quaternary compound having the following formula:

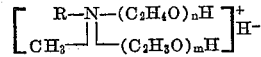

wherein R is an alkyl radical having from 8 to 16 carbon atoms inclusive, X is an anion, and $n$ and $m$ are each whole numbers from 1 to 14 inclusive.

8. The process of claim 7 in which the polyethoxylated quaternary compound is one in which the sum of $n$ and $m$ is in the range of 10 to 20.

9. In the process of electrodepositing copper, the step of depositing copper from an alkaline-cyanide bath comprising copper cyanide, free cyanide, and between 0.05 and 0.15 g./l. of at least one polyethoxylated quaternary compound having the following formula:

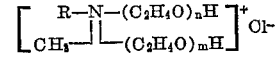

wherein R is an alkyl radical having from 12 to 14 carbon atoms inclusive, and $n$ and $m$ are each whole numbers from 1 to 14 inclusive, and the sum of $n$ and $m$ is between 10 and 20.

10. The process of claim 9 in which the alkyl radical is derived from a natural fatty acid formed from coconut and wherein the sum of $n$ and $m$ is about 15.

11. The process of claim 9 in which the alkyl radical is an oleyl radical and wherein the sum of $n$ and $m$ is about 15.

12. The process of claim 9 in which the alkyl radical is a stearyl radical and wherein the sum of $n$ and $m$ is about 15.

13. An improved alkaline-cyanide bath for copper plating which comprises copper cyanide, free cyanide, and between 0.25 g./l. and 0.5 g./l. of at least one polyethoxylated quaternary cation having the following formula:

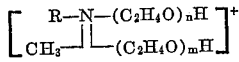

wherein R is an alkyl radical having from 8 to 16 carbon atoms inclusive, and $n$ and $m$ are each whole numbers from 1 to 14 inclusive.

14. An improved alkaline-cyanide bath for copper plating which comprises copper cyanide, free cyanide, and between 0.025 g./l. and 0.5 g./l. of at least one quaternary cation having the following formula:

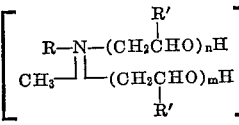

wherein R is an alkyl radical having from 8 to 16 carbon atoms inclusive, R' is selected from the class consisting of hydrogen and the methyl group, and $n$ and $m$ are each whole numbers from 1 to 14 inclusive.

15. An improved alkaline-cyanide bath for copper plating which comprises copper cyanide, free cyanide, and between 0.05 g./l. and 0.15 g./l. of at least one quaternary compound having the following formula:

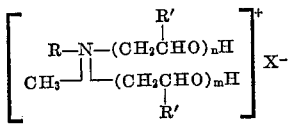

wherein R is an alkyl radical having from 8 to 16 carbon atoms inclusive, R' is selected from the class consisting of hydrogen and the methyl group, X is an anion, and $n$ and $m$ are each whole numbers from 1 to 14 inclusive.

16. An improved bath as defined in claim 15 in which X is an anion selected from the class consisting of chloride, bromide, methosulfate and ethosulfate.

17. An improved alkaline-cyanide bath for copper plating which comprises copper cyanide, free cyanide, and between 0.05 g./l. and 0.15 g./l. of at least one propoxylated quaternary cation having the following formula:

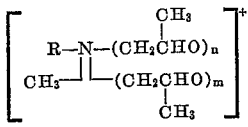

wherein R is an alkyl radical having from 8 to 16 carbon atoms inclusive, and $n$ and $m$ are each whole numbers from 1 to 14 inclusive.

18. A bath as defined in claim 17 wherein the sum of $n+m$ is 2.

19. In a process for electrodepositing copper, the step of depositing copper from an alkaline-cyanide bath comprising copper cyanide, free cyanide, and between 0.05 g./l. and 0.15 g./l. of at least one quaternary cation having the following formula:

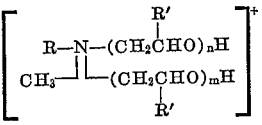

wherein R is an alkyl radical having from 8 to 16 carbon atoms inclusive, R' is selected from the class consisting of hydrogen and the methyl group, and $n$ and $m$ are each whole numbers from 1 to 14 inclusive.

References Cited in the file of this patent

UNITED STATES PATENTS

| | | |
|---|---|---|
| 2,541,700 | Holt | Feb. 13, 1951 |
| 2,848,394 | Foulks et al. | Aug. 19, 1958 |

FOREIGN PATENTS

| | | |
|---|---|---|
| 778,208 | Great Britain | July 3, 1957 |